(12) United States Patent
Dragajewa-Turowska

(10) Patent No.: US 10,467,917 B2
(45) Date of Patent: Nov. 5, 2019

(54) INTERACTIVE VIDEO SYSTEM AND A METHOD OF CONTROLLING AN INTERACTIVE VIDEO SYSTEM BASED ON A MOTION AND A SOUND SENSORS

(71) Applicant: FOUNTAIN DIGITAL LABS LIMITED, London (GB)

(72) Inventor: Swietlana Dragajewa-Turowska, London (GB)

(73) Assignee: FOUNTAIN DIGITAL LABS LIMITED, London (GB)

( * ) Notice: Subject to any disclaimer, the term of this patent is extended or adjusted under 35 U.S.C. 154(b) by 212 days.

(21) Appl. No.: 15/195,702

(22) Filed: Jun. 28, 2016

(65) Prior Publication Data

US 2017/0372629 A1    Dec. 28, 2017

(51) Int. Cl.
| | | |
|---|---|---|
| G09B 5/06 | (2006.01) | |
| G09B 5/12 | (2006.01) | |
| G09B 19/00 | (2006.01) | |
| A63F 13/211 | (2014.01) | |
| A63F 13/5372 | (2014.01) | |
| A63F 13/92 | (2014.01) | |
| A63F 13/428 | (2014.01) | |
| G06F 3/0346 | (2013.01) | |
| G06F 1/16 | (2006.01) | |
| G06F 3/01 | (2006.01) | |
| G06F 3/0484 | (2013.01) | |
| G11B 27/10 | (2006.01) | |
| G06F 3/16 | (2006.01) | |

(52) U.S. Cl.
CPC ............ *G09B 5/065* (2013.01); *A63F 13/211* (2014.09); *A63F 13/428* (2014.09); *A63F 13/5372* (2014.09); *A63F 13/92* (2014.09); *G06F 1/1626* (2013.01); *G06F 1/1694* (2013.01); *G06F 3/017* (2013.01); *G06F 3/0346* (2013.01); *G06F 3/04845* (2013.01); *G06F 3/167* (2013.01); *G09B 5/125* (2013.01); *G09B 19/003* (2013.01); *G11B 27/102* (2013.01); *A63F 2300/105* (2013.01); *A63F 2300/1006* (2013.01); *A63F 2300/1062* (2013.01); *A63F 2300/204* (2013.01); *A63F 2300/6045* (2013.01)

(58) Field of Classification Search
None
See application file for complete search history.

(56) References Cited

U.S. PATENT DOCUMENTS

| | | | |
|---|---|---|---|
| 2002/0072418 A1 | 6/2002 | Masuyama et al. | |
| 2003/0216176 A1 | 11/2003 | Shimizu et al. | |
| 2006/0046848 A1 | 3/2006 | Abe et al. | |
| 2006/0109102 A1* | 5/2006 | Gortz | H04M 1/6505 340/531 |
| 2007/0136444 A1* | 6/2007 | Bentsen | G06Q 30/06 709/219 |

(Continued)

FOREIGN PATENT DOCUMENTS

WO    2014/037876    3/2014

*Primary Examiner* — Jason T Yen
(74) *Attorney, Agent, or Firm* — Pillsbury Winthrop Shaw Pittman LLP

(57) ABSTRACT

An interactive video system includes: a display arranged to display a video; a motion sensor and/or sound sensor integrated with the display a controller, responsive to detection of a signal from the motion sensor derived when the display is moved, to cause a change in the displayed video.

16 Claims, 12 Drawing Sheets

(56) References Cited

U.S. PATENT DOCUMENTS

| | | | |
|---|---|---|---|
| 2009/0280910 A1* | 11/2009 | Gagner | G07F 17/32 463/42 |
| 2011/0148789 A1* | 6/2011 | Kim | G03B 17/54 345/173 |
| 2011/0223995 A1* | 9/2011 | Geisner | G06F 3/011 463/36 |
| 2013/0066586 A1 | 3/2013 | Miyamoto et al. | |
| 2013/0257858 A1* | 10/2013 | Na | A63F 13/10 345/419 |
| 2013/0265217 A1 | 10/2013 | Sakaguchi et al. | |
| 2014/0011588 A1* | 1/2014 | Masuyama | A63F 13/211 463/31 |
| 2014/0274239 A1 | 9/2014 | Han | |
| 2015/0193110 A1* | 7/2015 | Takahashi | G06F 3/0486 715/769 |
| 2015/0224395 A1* | 8/2015 | Trombetta | A63F 13/497 463/24 |
| 2015/0358579 A1* | 12/2015 | Shin | H04R 1/406 348/14.16 |
| 2016/0089028 A1* | 3/2016 | Chatterjee | A61B 5/0002 340/870.07 |

\* cited by examiner

INTERACTIVE VIDEO SYSTEM AND A METHOD OF CONTROLLING AN INTERACTIVE VIDEO SYSTEM BASED ON A MOTION AND A SOUND SENSORS

The present invention relates to an interactive video system, a training system and a method of controlling an interactive video system.

A video system typically comprises a display for video and a source of the video data to be displayed. The source could be integrated memory within the display device or a hard disk drive upon which a video file in known format (such as MPEG4) is stored. Any other known source of the video data could also be used. A further example is a receiver of a video broadcast which receives a video stream and provides this for display. The content of the video can be engaging and interesting for a viewer but the interaction that a viewer can have with the video is limited. The typical controls of a video display would include the usual control features such as Play, Stop, Forward, Rewind and the like.

There is a desire to improve the viewer interaction with a video.

According to a first aspect of the present invention, there is provided an interactive video system, comprising: a display arranged to display a video; a motion sensor included or integrated with the display; a controller, responsive to detection of a signal from the motion sensor to cause a change in the displayed video.

According to a second aspect of the present invention, there is provided an interactive video system, comprising: a display arranged to display a video a sound sensor integrated with the display; a controller, responsive to detection of a signal from the sound sensor derived when a user interacts with the system, to cause a change in the displayed video.

An interactive video system that enables a user to control and interact with the subject of a video in an intuitive and immersive manner by use of a motion and/or sound sensor within a tablet computing device, smartphone or other device capable of playing video and being handheld.

In an embodiment, the interactive video system comprises a sound sensor also included or integrated with the display, wherein the sound sensor is coupled to the controller, the controller also being arranged to be responsive to detection of a signal from the sound sensor to cause a change in the displayed video.

In an embodiment, the controller is configured to cause a change in the video only when receiving simultaneously a signal from the motion sensor and the sound sensor.

In an embodiment, the display is arranged to display a sliding scale to indicate level of movement detected by the motion sensor.

In an embodiment, the display is arranged to display a sliding scale to indicate volume and/or pitch of sound detected by the sound sensor.

According to a third aspect of the present invention, there is provided a method of controlling an interactive video system, the method comprising:
displaying a video of a subject, providing a motion and/or sound sensor; providing a controller, the controller being arranged to be responsive to detection of a signal from the motion and/or sound sensor to cause a change in the displayed video.

In an embodiment, the controller is configured to cause a change in the video only when receiving simultaneously a signal from the motion sensor and the sound sensor. The system is thus arranged to require two simultaneous inputs from a user to prompt a response in the video displayed. This encourages a user to multi-task in way that will train the user to deal with a situation that might occur and in which such multi-tasking is required. For example, in an industrial accident scenario an individual would typically require to be physically doing things whilst talking and explaining or even shouting at others to do things too. The dual input control of the present system provides good training for this.

According to a fourth aspect of the present invention, there is provided a training system comprising an interactive video system according to the first aspect of the present invention, wherein the training system is arranged to display video of a training scenario and to prompt a user for an input and to provide feedback to the user dependent on the user input.

In an embodiment, the training scenario relates to an industrial manufacturing or processing plant.

In an embodiment, the training scenario includes video of an accident in an industrial environment and prompts for a user response to the scenario.

According to a fifth aspect of the present invention, there is provided a gaming system including an interactive video system according to the first aspect of the present invention, wherein the video is video of an animal in an environment, and the video includes prompts to user to drive a change in the animal's environment.

A gaming system of this type provides enhanced educational value from increasing tactile and/or vocal interaction with the system whereas previously interactive video systems (ivods) have only required the pressing of buttons.

In an embodiment, the change includes one or more of providing the animal, with food, providing the animal with water, providing the animal with instruction to move in a certain direction.

In an embodiment, the display is provided on a hand held video display device, such as a tablet computer.

According to a sixth aspect of the present invention there is provided software code either alone or embodied on a machine readable medium which when loaded up on a tablet computing device causes the device to function as an interactive video system according to first or second aspect of the present invention.

Embodiments of the present invention will now be described in detail with reference to the accompanying drawings, in which:

FIGS. 7 and 8 are views of screens showing different interfaces of the same interactive video system from which FIGS. 3 to 6 are derived;

FIGS. 9 and 10 are views of screens showing different interfaces of the same interactive video system from which FIGS. 2 to 6 are derived.

Figure 1:
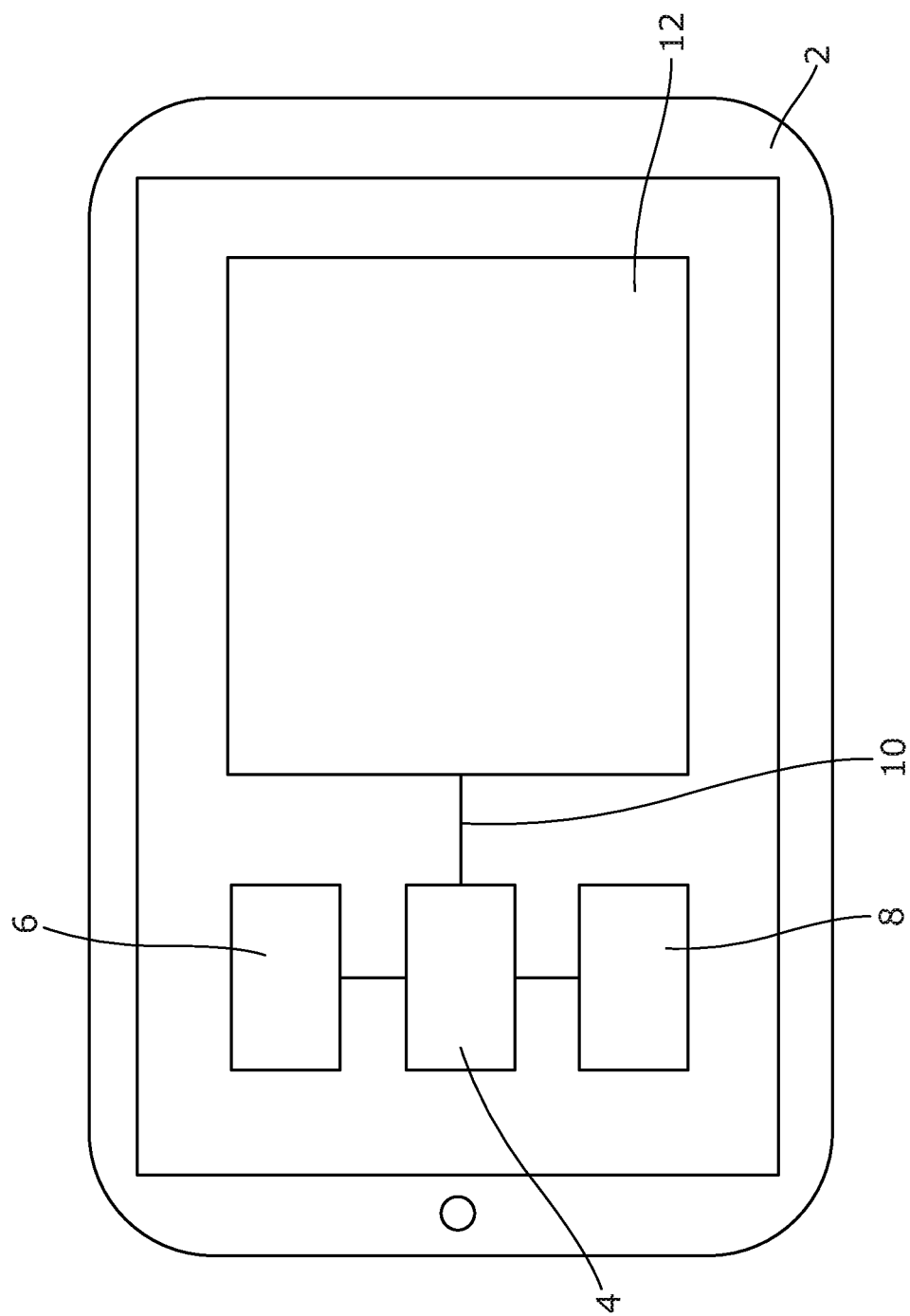
FIG. 1 is a schematic view of the functional components of an interactive video system according to an embodiment.

FIG. 1 is a schematic view of the functional components of an interactive video system according to an embodiment. As shown, the system is embodied on a tablet computing device 2. The tablet computing device may be a commonly available device such as an Apple IPad or a Samsung Galaxy tablet or indeed any other known tablet computing device or indeed a smartphone or any display device that is capable of being handheld to enable the required control, movement and manipulation in use. In addition, it could also be a device such as a smart phone or indeed any hand-held computing device that is capable of displaying a video. The system, shown schematically, includes a controller 4 coupled to memory (not shown) or indeed including integrated memory. The tablet 2 will generally contain memory and it is preferred that the controller 4 connects to the memory via the integrated connectivity within the device, e.g. the system data bus.

A motion sensor 6 and a sound sensor 8 such as a microphone are also provided. The motion sensor 6 and sound sensor 8 are coupled directly to the processor 4. The processor 4 has an output 10 which is used to drive a video display 12. Typically, the video display 12 would occupy all or substantially all of the available exposed surface of the tablet 2 and in the example shown the video display 12 is merely shown as a functional component within the layout rather than as the actual screen itself. The interactive video system is arranged such that the motion sensor 6 and sound sensor 8 derive signals from user interaction which are used as input to the processor 4 and thereby used to drive the display on the video 12. The processor 4 and the sensors 6 and 8 are of the sort typically provided within a tablet, but are now used in a novel and non-obvious technical manner to control the interactive video system.

As explained above whilst there is much video content currently available that is engaging and interesting for a viewer, the interaction that a viewer can have with the video is limited. The present system utilises motion and/or sound sensors to generate inputs to a controller, thereby to drive the display of video in a more intuitive and interactive manner. This has a number of important applications. A significant area of use for the system is in the application of training for industrial manufacturing. By the use of role plays and interactive video which requires tactile or audible responses from a user, the understanding of the scenarios that a user can experience are enhanced.

The description that follows will relate to the use of the interactive video system in implementing a gaming system, but it will be appreciated that the interactive video system is more generally applicable and that the disclosure is not therefore limited merely to the use of the interactive video system within a gaming system.

Figure 2A:
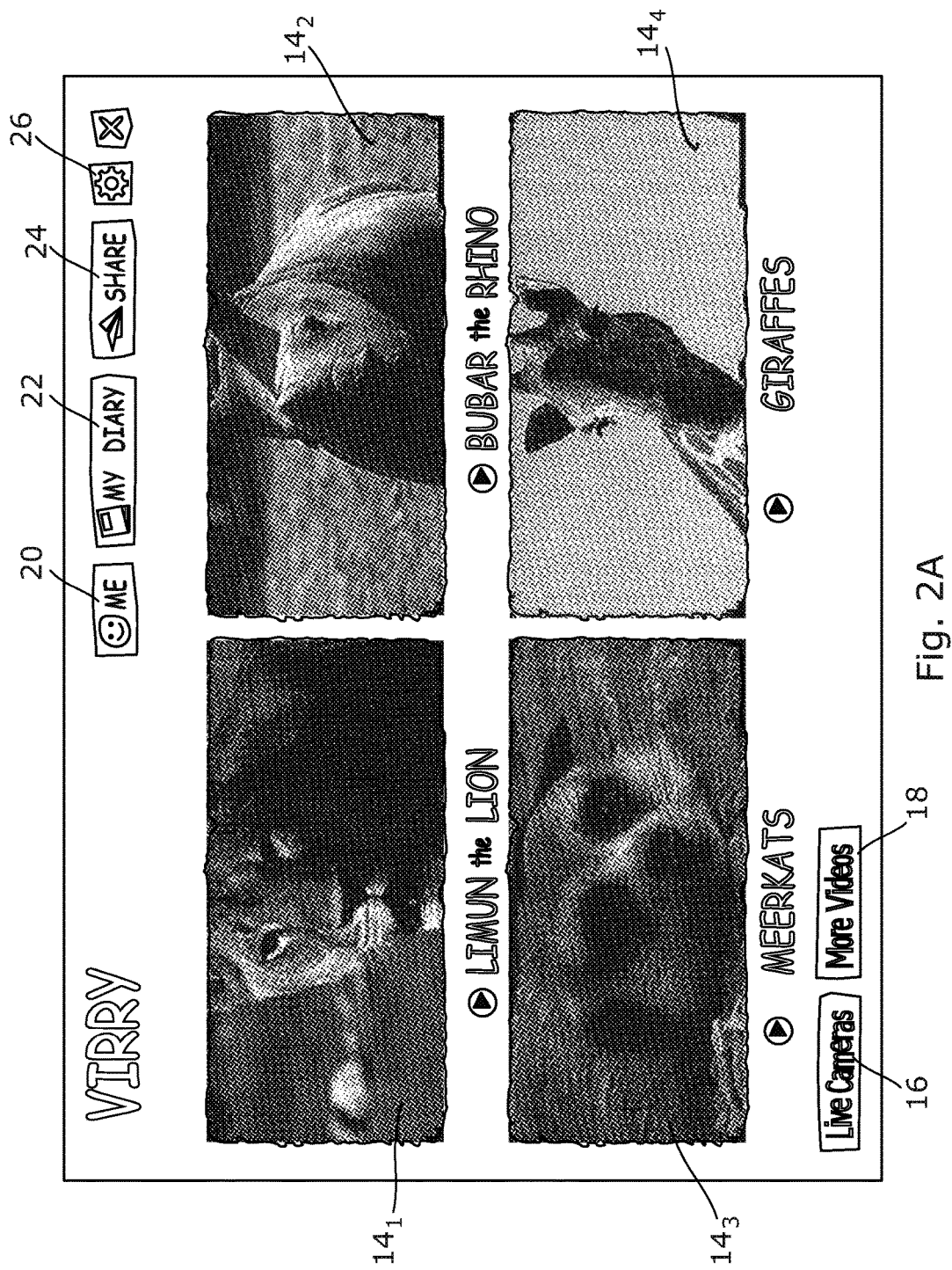
FIG. 2A is a view of a welcome interface or homepage on a tablet computer showing the interactive video interface.

FIG. 2A is a sample screen shot of a welcome interface or "home" screen for an interactive video system being used to control or implement a gaming system. In the example shown, the gaming system is one that enables users to learn and interact with animals. The screen shot may be from a tablet computing device such as an Apple IPad or a Samsung Galaxy tablet or indeed any other known tablet computing device or indeed a smartphone or any display device that is capable of being handheld to enable the required control, movement and manipulation in use. In addition, the screen shot could be from a device such as a smart phone or indeed any hand-held computing device that is capable of displaying a video.

The home screen includes a number of different fields. First, there are four animal windows $14_1$ to $14_4$. Each of these is a selection icon. Preferably the tablet device has a touch screen interface and so if a user selects one of these icons by touching the screen, then he will enter into the part of the system dedicated to that animal.

In the bottom left of the interface, there are provided two selection buttons 16 and 18. The "Live Cameras" button 16 is for selecting a live video stream which is preferably provided in association with a zoo or animal enclosure which houses various animals. The "More Videos" button 18 is a selection button which provides a menu of a large number of animals for accessing for each of which is provided a short linear video that has associated with it one or more "emotional tags".

Figure 2B:
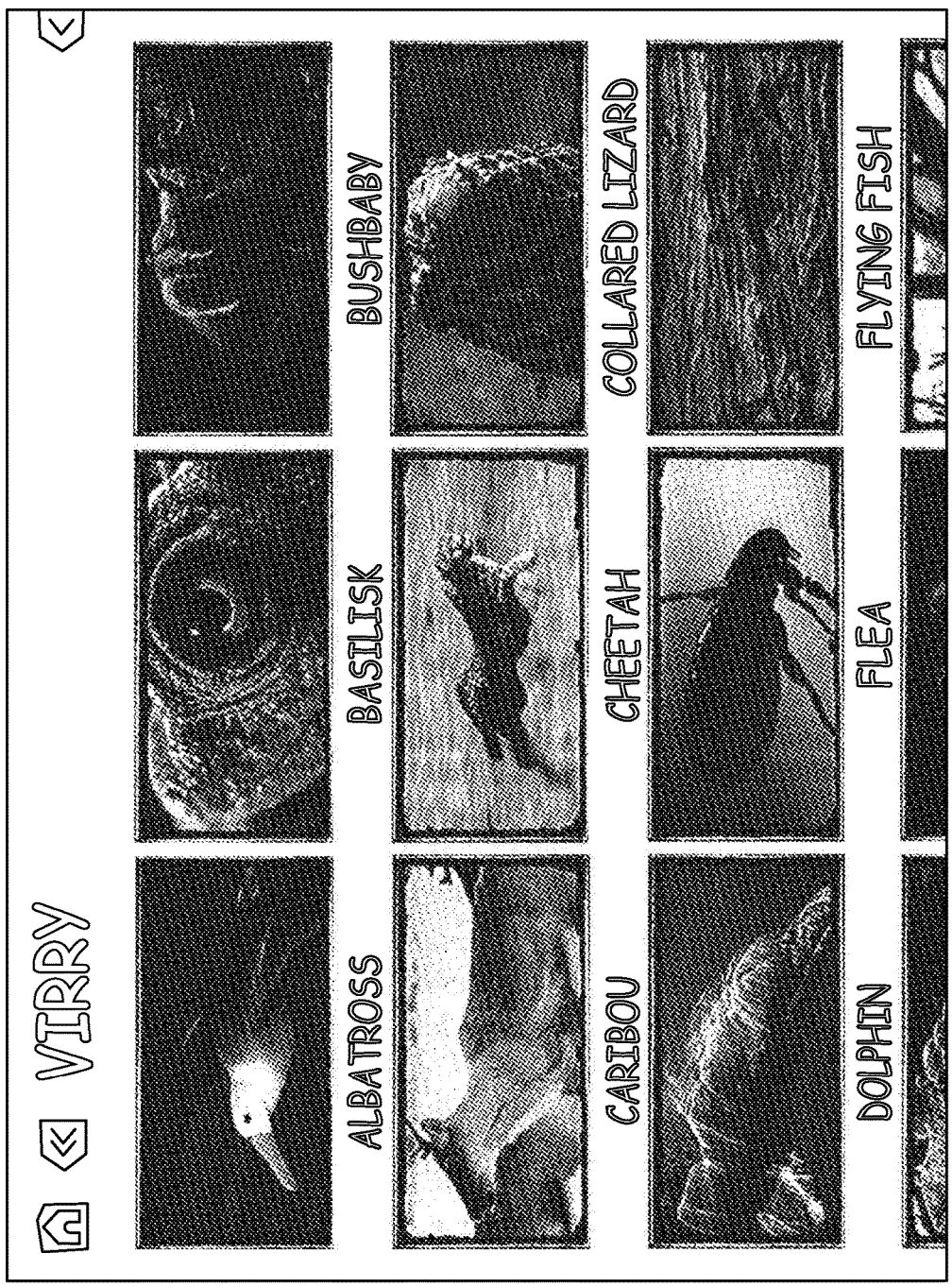
FIG. 2B shows a screenshot of the available menu of linear videos.
Figure 2C:
FIGS. 2C and 2D show screenshots of examples two of the entries from the menu of FIG. 2B.
Figure 2D:
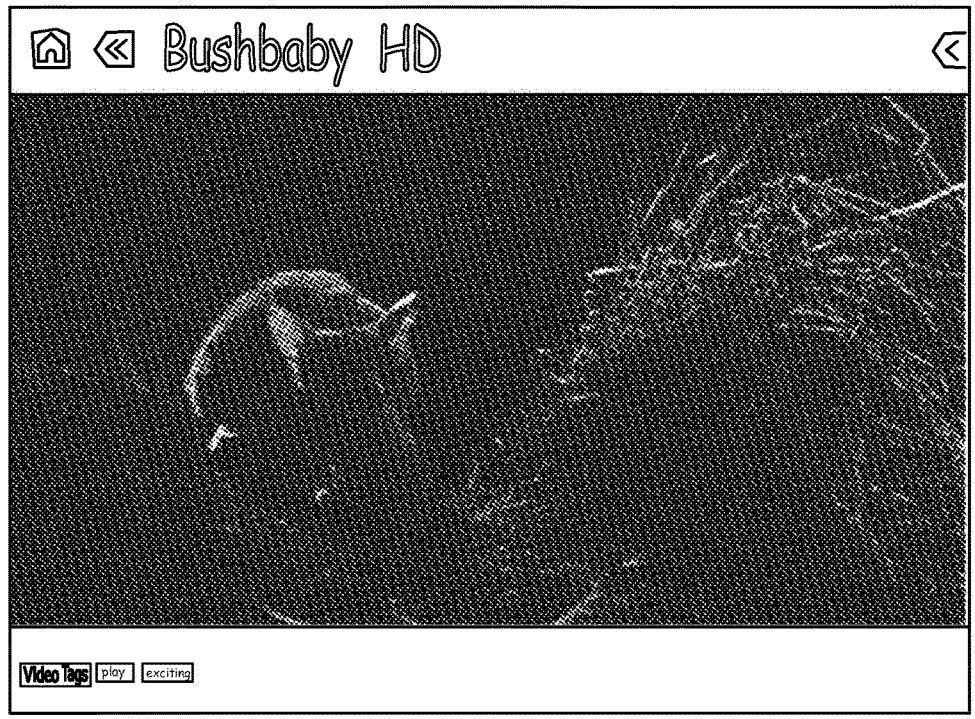

FIG. 2B shows a screenshot of the available menu of linear videos. An emotional tag is simply a word that describes the emotions associated, prompted by or supported by the content of the linear video. FIGS. 2C and 2D show screenshots of examples two of the entries from the menu of FIG. 2B. FIG. 2C is the entry for the Albatross and includes the emotional tags "relax" and "exciting". FIG. 2D is the entry for the Bushbaby and includes the emotional tags "play" and "exciting".

When a user selects one of the linear videos it plays automatically and then when it finishes another of the videos which has the same emotional tags then starts playing such that the user is shown a sequence of, say, 4 or 5 linear videos, each of which has the same the same tags and which are consistent with the user's selection. Once the playlist has completed, a user can return to the main menu or homepage or simple make another selection as an entry or start point. The videos included in any playlist preferably have both of the emotional tags the same although in one example it is sufficient if only one of the tags is the same.

In another example, as well as or instead of providing the linear videos, the "More Videos" button 18 can provides a menu of a larger number of animals for accessing for each of which a full interactive menu is available, as will be described below. In the screen shot shown in FIG. 2, there are four options, which are a lion, a rhino, meerkats and giraffes. These are particularly popular animals for interaction with and therefore they are presented as the four options on the home screen. However the More Videos button 18 enables a user to select any other animal for which films have been made. Clearly, there is no limit on the number of animals that can be provided for within the system.

At the top of the interface, a button labelled "Me" 20 is provided. This is a selection button for connecting to a user home screen or user homepage, which will be described below with reference to FIG. 9. The "My Diary" button 22 will be described below with reference to FIG. 10. Last, a "Share" button 24 is provided which provides a means for a user to share their interactions with other users as part of a community. A "Settings" button 26 is also provided. The term "button" is used to refer to a region of the touch screen interface that is used as a selection area for causing an action to occur.

Thus far, the interactive video system is merely presented as a list of selections to be made such that a user can choose which animal they want to watch or engage with. As will now be described, once a user selects one of the interface windows $14_1$ to $14_2$, a number of options are provided and the interactive video system will provide the user with an innovative and immersive experience.

Figure 3:
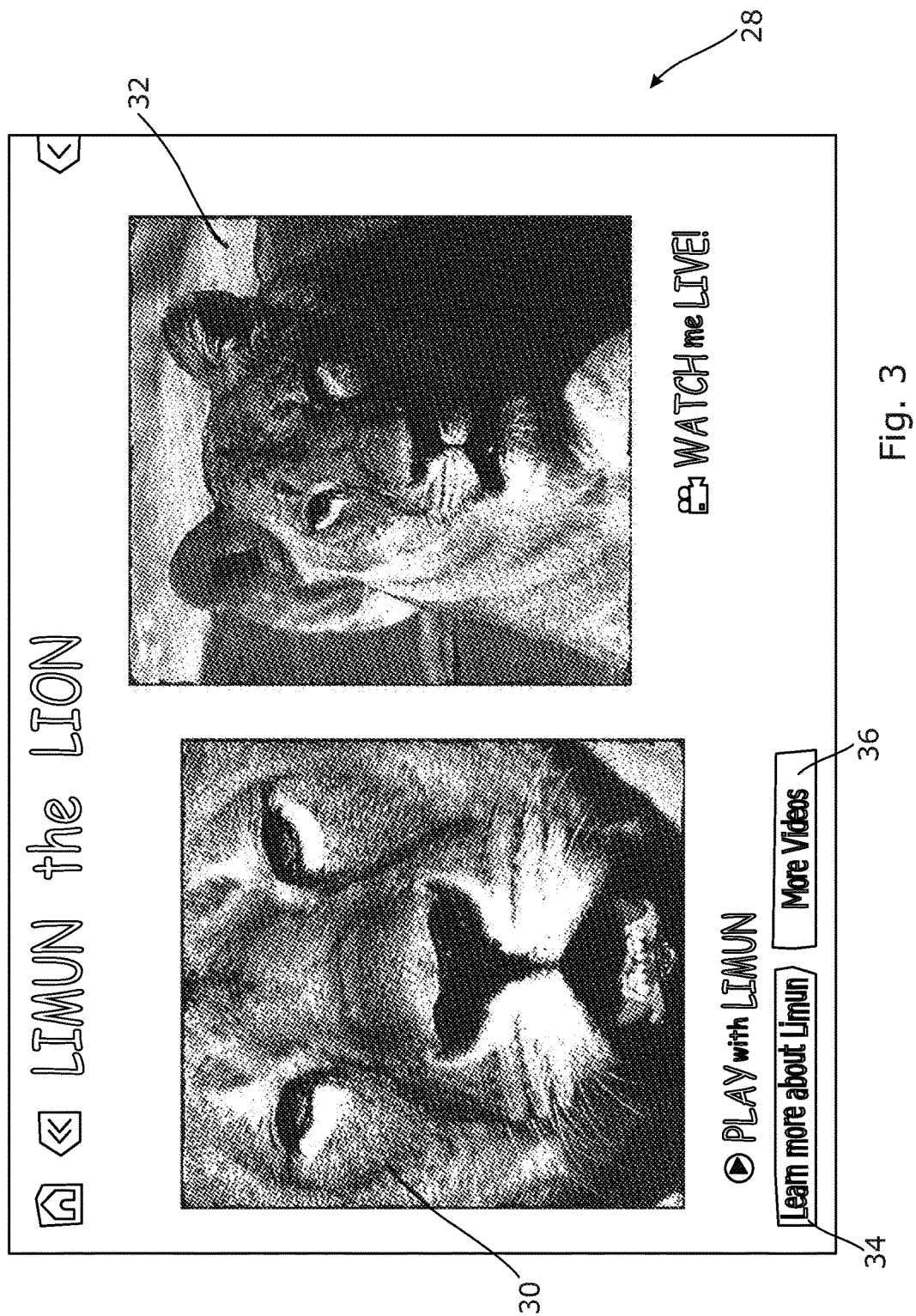
FIGS. 3 to 6 are views of screens showing different interfaces of an interactive video system.

Referring to FIG. 3, an interface 28 is shown which contains two main display windows 30 and 32. Window 30 offers the user the opportunity to "Play with Limun" (the lion is named "Limun") whereas window 32 offers the user the opportunity to stream live footage of the lion enclosure of an associated zoo. Clearly, in advance, a zoo has agreed to the placement of live stream cameras within various of its enclosures. Two further interaction buttons are provided at the bottom of the screen. Button 34 is entitled "Learn More About Limun". If a user selects this then facts about Limun will be presented to them. If they select the "More Videos"

button, then just as with the More Videos button 18 shown in FIG. 2, a menu of further animals will be presented.

Figure 4:
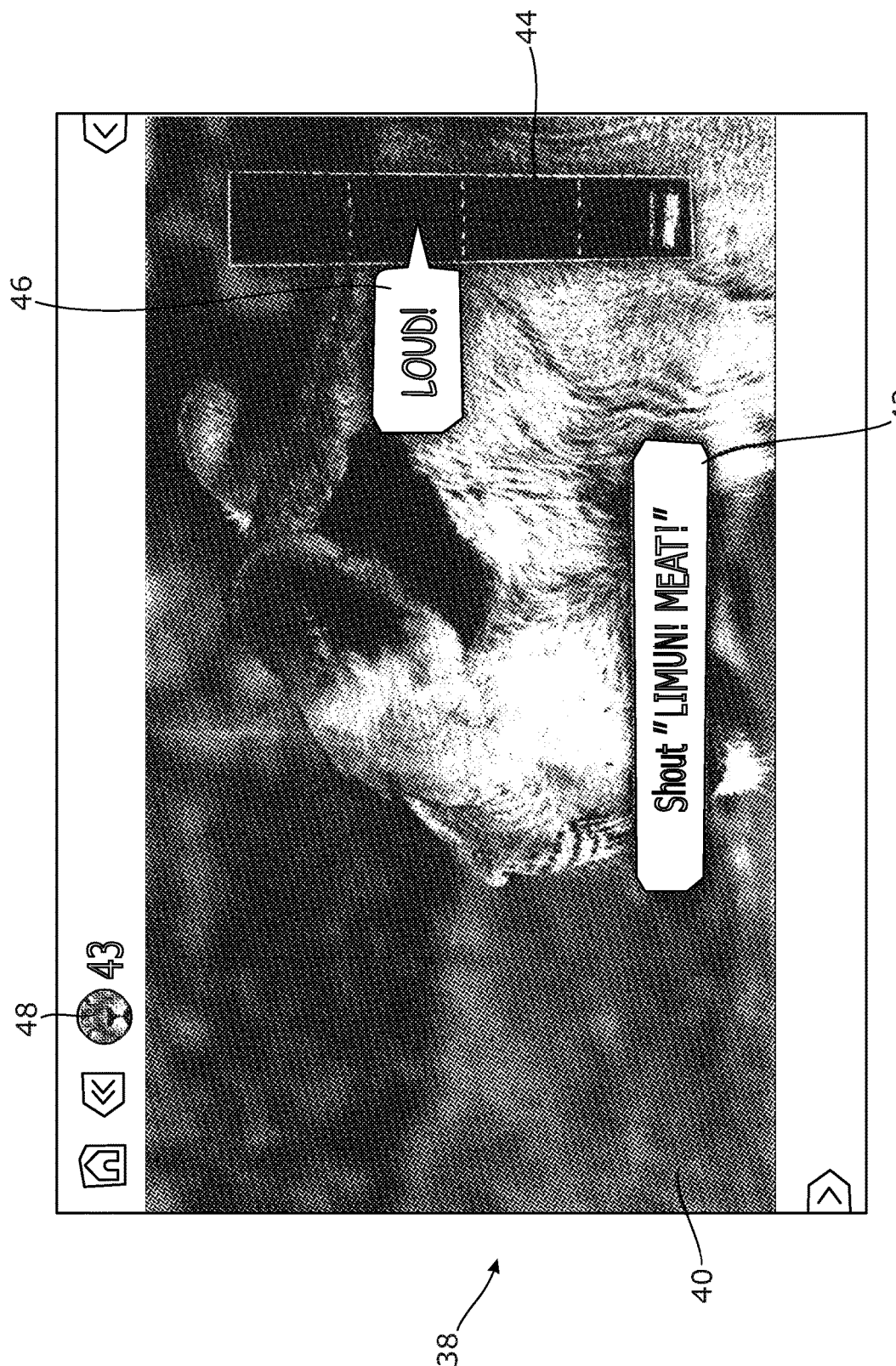

The interactive video system will now be described in greater detail with reference to FIG. 4. FIG. 4 is a screen shot 38 of an interactive video interface. The image 40 is of the lion selected via window 30 shown in FIG. 3. Now a command is presented on the screen 42 which instructs a user to "Shout "Limun meat!"". In addition, an audible message recorded in advance is played such that a user hears the instruction to shout "Limun meat". A detected volume indicator 44 is provided which indicates how loud the user has shouted and suggests, with the indicator 46 a threshold that is required to ensure that the task is completed. Presuming that the task is completed the video proceeds by playing some footage of some meat being dropped into the lion's enclosure. Thus, by following the instruction from the interactive video system and acting upon it by shouting as instructed, the user has fed the lion.

A points indicator 48 is provided at the top of the screen. A user accrues points by successfully completing the tasks by feeding the lion or doing other such requirements. The collected points can be used for trading with other users of the system or for achieving "levels" of user, described below with reference to FIG. 9.

Figure 5:
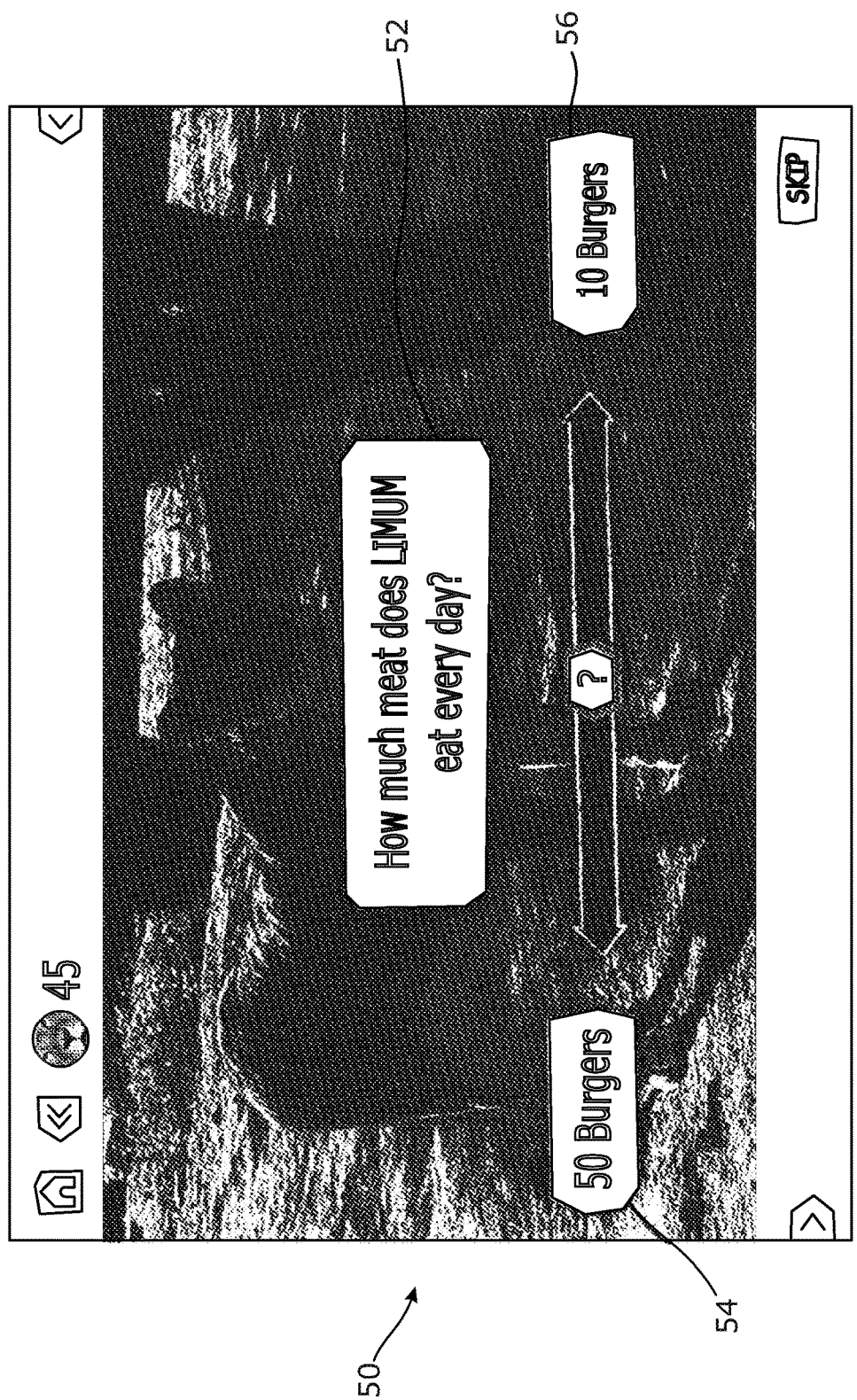

FIG. 5 shows a training screen 50 which again is used to train a user regarding the subject of the video, in this case again Limun the lion. Thus, a question 52 is presented to a user asking "How much meat does Limun eat every day?". Two options are presented and a user, via the buttons 54 and 56 must select the answer that they believe to be correct. If they get the answer correct then the interface informs them either by written message or by an audible message of congratulation. It will be appreciated that although the question in the example might seem very simple and straightforward, the questions and their complexity can be varied based on the target audience. In the example shown the system is designed for young children and therefore the questions are appropriately straightforward.

Figure 6:
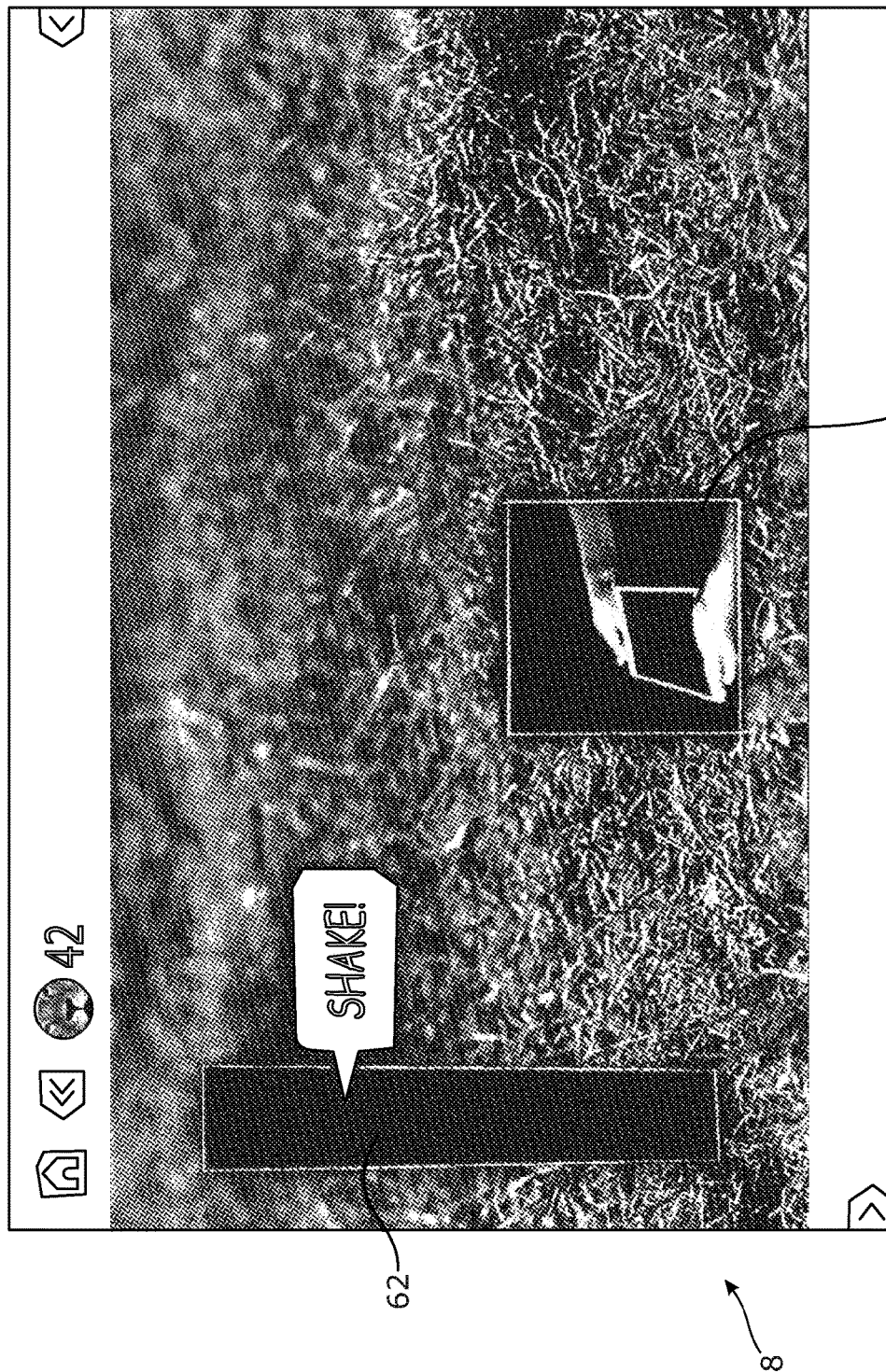

FIG. 6 now shows an interactive screen 58. The screen includes an instruction to a user to shake the tablet device so as to prompt a response in the video. An instruction window 60 is provided which shows the user exactly what interaction is required with the tablet to generate the response. An indicator window 62 is provided to show the user how successful they have been in performing the task. An audible message will also be played to the user at this stage instructing them to shake or tip or indeed perform any desired physical movement of the device so as to feed the lion. Thus, by shaking the tablet device or tipping it up in the manner shown the video is controlled to perform the specified action. The movement sensor 6 (described above with reference to FIG. 1) is used as the drive for the processor 4 to control the action within the video presented to a user.

In this case, a lump of meat will, once the user has shaken the tablet correctly, drop into the video frame. Thus, the motion sensor that is integrated within the tablet device 2 is used to provide an input signal to the processor so as to drive the content of the video in accordance with a user's action. By the continual direct physical interaction with the tablet and the effect that this has on the displayed video, a user will build emotional and physical relationships with the subject of the video such that in the case of a young child learning about animals a positive sense of engagement with the animal will be encouraged and enhanced.

In another example as well as being prompted or instructed to shake or move the tablet, smartphone or other device, the user could be prompted to hold the device still or be silent so as to cause a desired action in the video to occur. Again then it will be appreciated that the motion and/or sound sensors are used to detect a response of a user and use this to provide an input to the processor to control action within the displayed video.

Figure 7:
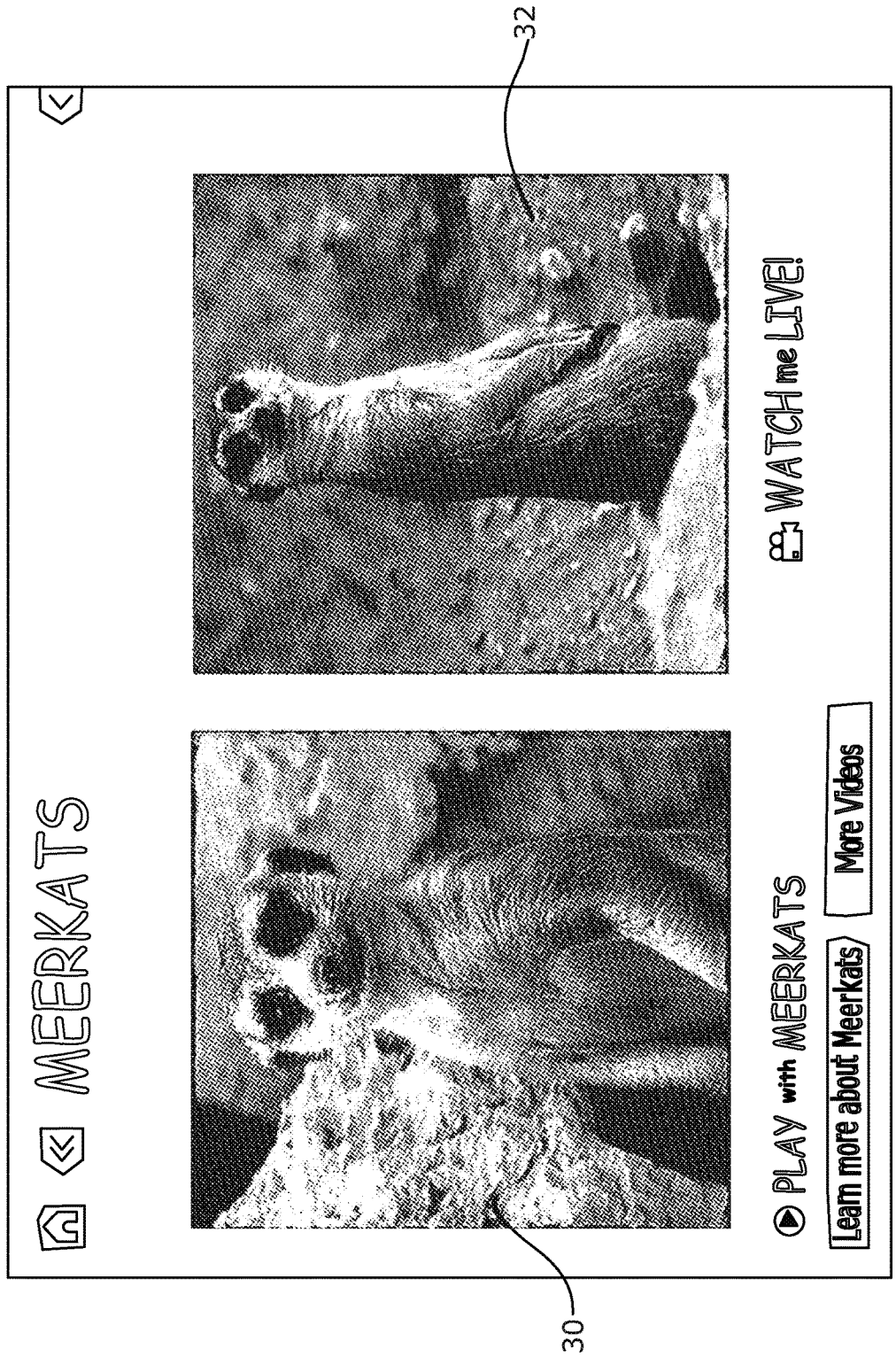

FIG. 7 shows the corresponding meerkat screen to that shown in FIG. 3 with respect to the lions. The windows 30 and 32 will provide corresponding options to the similarly numbered windows shown in FIG. 3. Clearly the tasks that will need to be completed in respect of the meerkats and the live video stream will be different but the principles will be substantially the same. For example, whereas with the lion the shaking and shouting at the screen draws the lion's attention to the presence of meat or causes the lion to be fed some meat, in the case of meerkats, it will cause the meerkats to be thrown a shovel full of sand containing worms.

Figure 8:
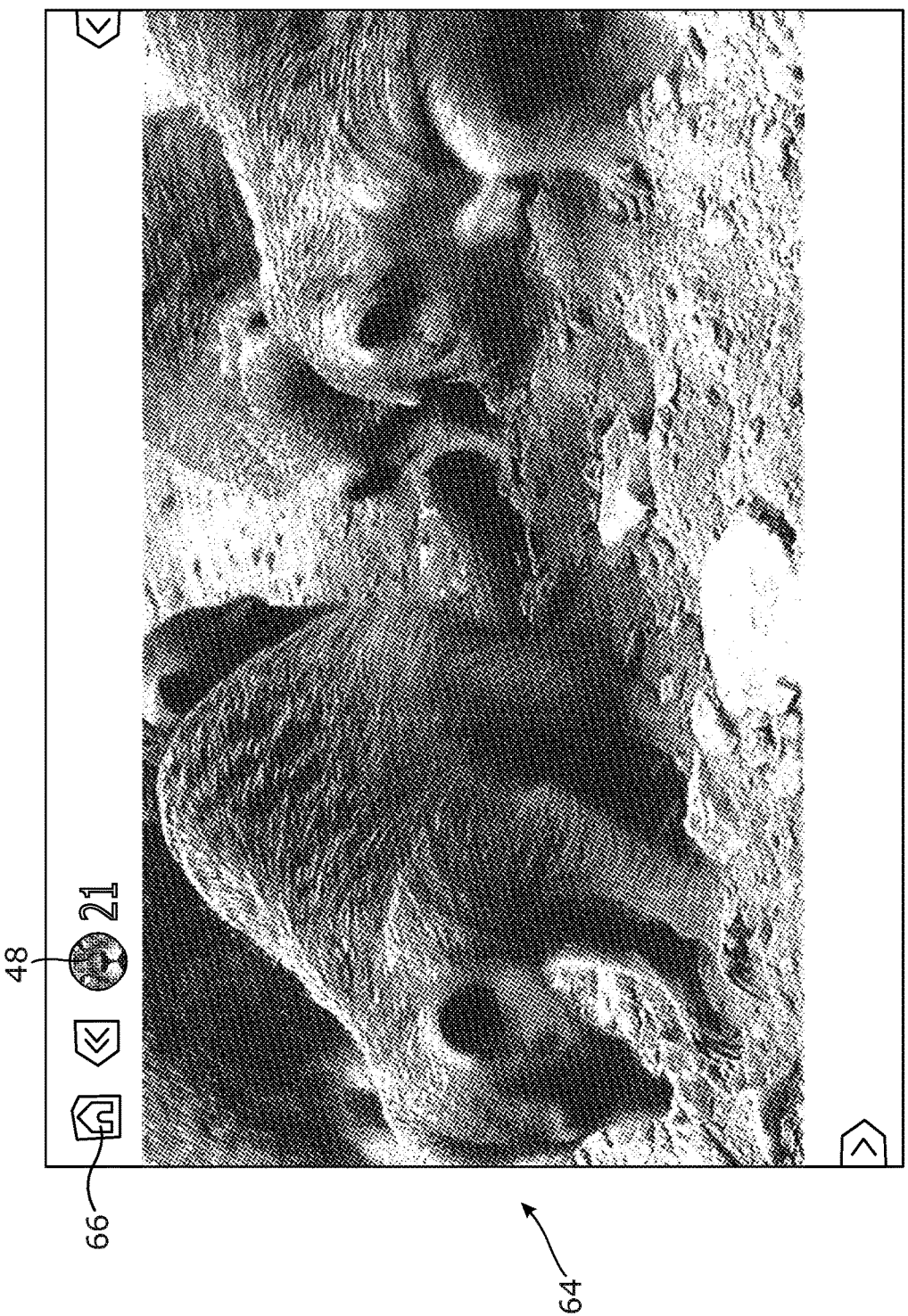

FIG. 8 shows a screen shot from the video footage of the meerkats. The meerkats can be seen searching for worms within the sand. The points indicator 48 shows how many meerkat points a user has accrued. A home button 66 is provided that enables the user to jump directly back to the home screen shown in FIG. 2.

In the examples shown, the interactive video system is described in relation to a children-animal interaction game. However in another example, the questions and options presented to a user, and the corresponding video relate to the training of engineers within an industrial environment. In other words, instead of asking a user to shake the iPad or talk to the iPad so as to cause an animal to be fed, the selections made by a user can determine the video that is shown regarding the progress of, say, a workplace accident or manufacturing process within an industrial environment. Thus, the benefits of a user understanding the situation and building a relationship with the conditions and situation is also achieved.

Figure 9:
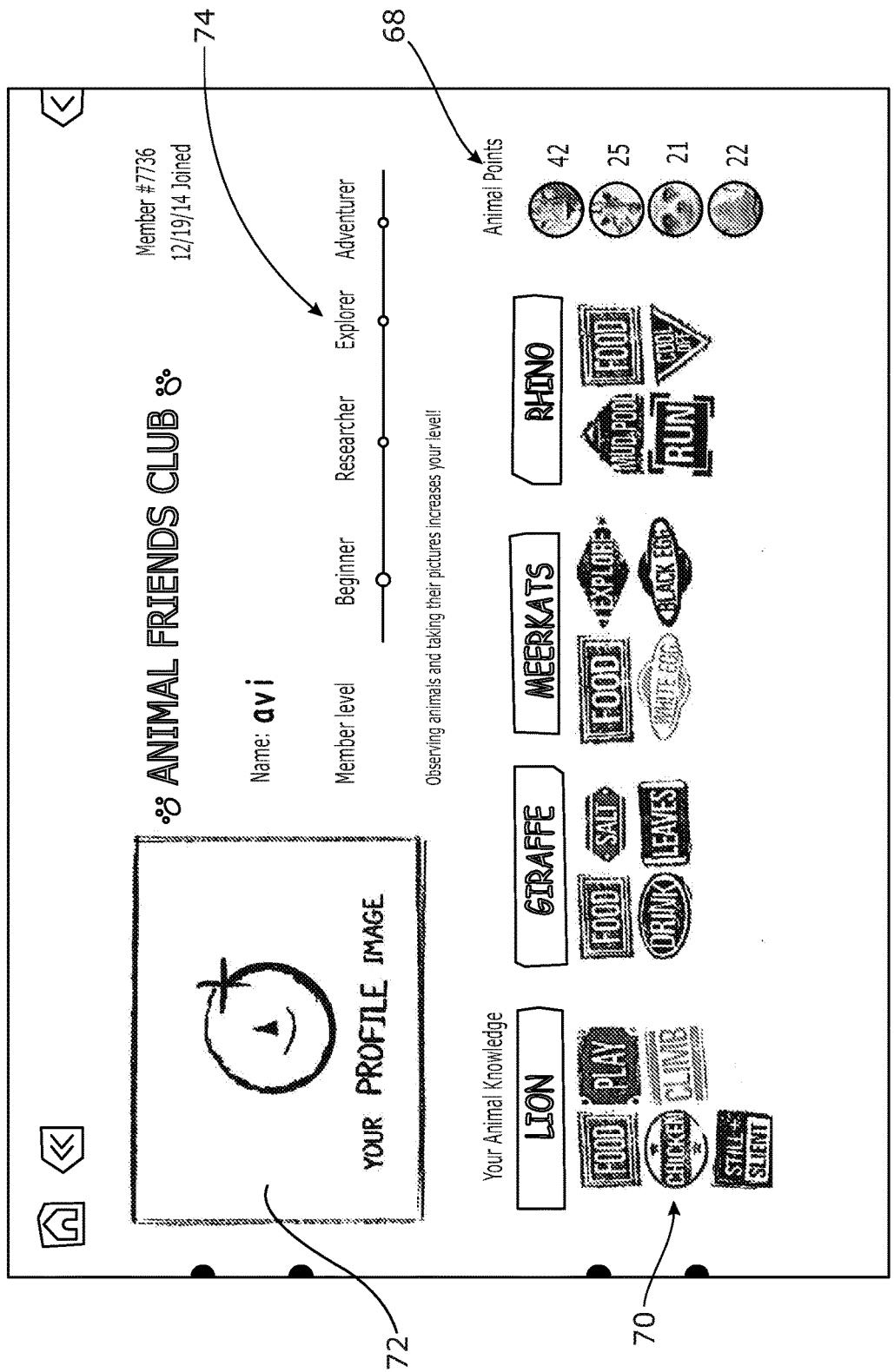

Referring now to FIG. 9, the "Me" screen is shown which is navigated to via selection of button 20 shown in FIG. 2. This is a user's profile page and includes a record of the animal points 68 achieved in respect of each of the animals that a user has engaged with. In addition, achievement badges 70 are indicated in respect of each of the four animals lions, giraffes, meerkats and rhinoceroses.

A window 72 is provided for display of a user's profile image. This is not required but enables a user to create a profile such that the page effectively becomes a user's homepage on an animal-based social network.

The membership level is recorded and can be used as target by a user. The longer they spend on the interactive video system and the more questions they answer correctly and tasks they complete, the higher their membership level will become.

In the case of industrial training, the user's homepage can instead record completed training tasks such that it can serve as a record of a user's knowledge and experience and therefore level of "safety" within a manufacturing environment.

Figure 10:
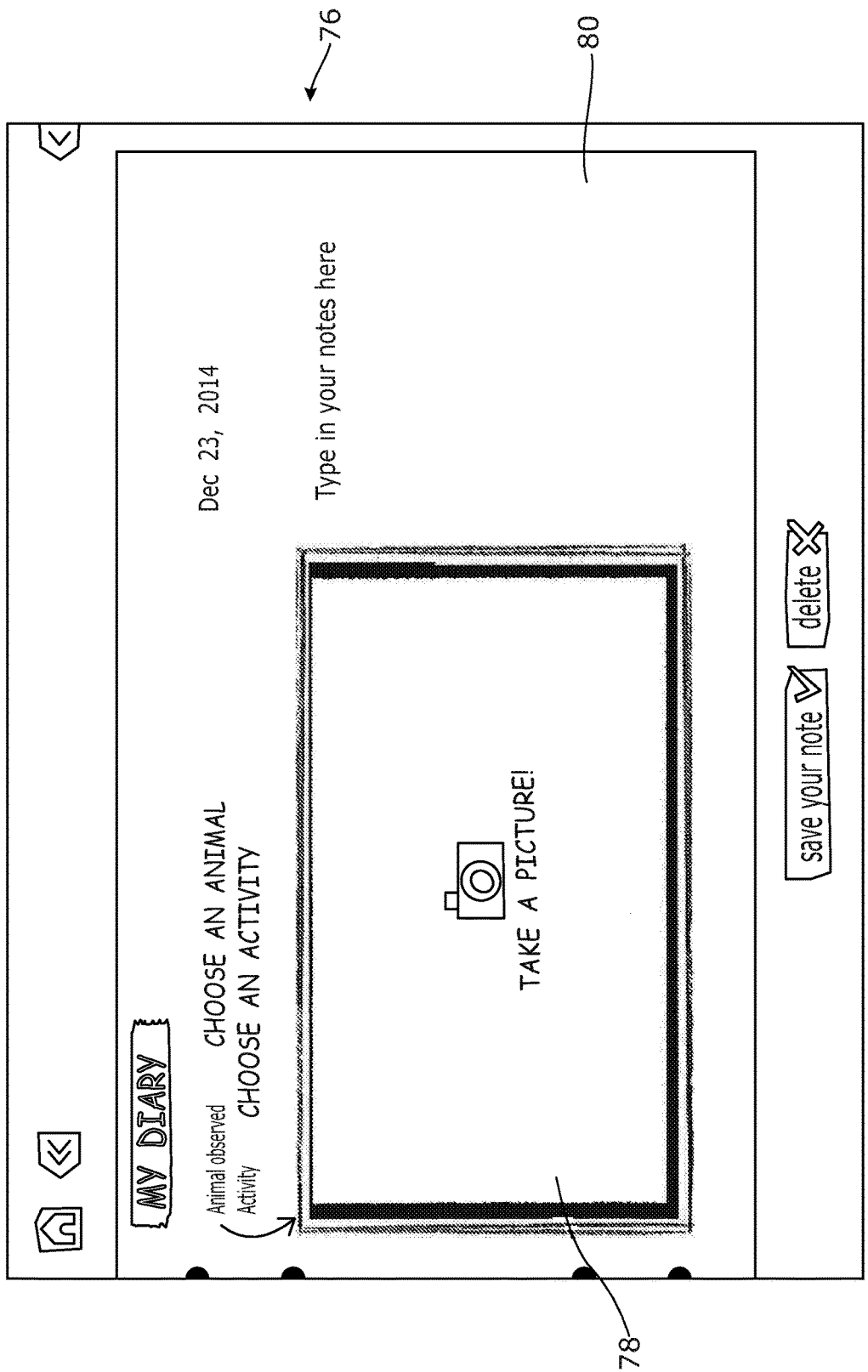

FIG. 10 is the "MY DIARY" homepage 76. This diary page 76 provides a means for a user to record images captured from the live video stream obtained via the button 16. An image region 78 is provided as is a textual interface region 80 within which a user can provide notes regarding the image that they are capturing. For example, if the image is of the meerkats playing then the user might type a note such as "Picture of Meerkats playing together".

Thus, overall it can be seen that the interactive video system provided enables the user to build relationships with the subject of video and also to actively control the video using the motion and/or sound sensors of the tablet device. In a preferred example, an interface requires both sound and movement such that the video is controlled in response to the user both moving the tablet device and talking or shouting at it. The requirement for a user to effectively engage on two different levels will further enhance the interaction with the system and the relationship that is built. In the case of user of the system for industrial training this can be particularly important since it can mimic closely the real world in which when dealing with a particular scenario a user both has to physically move something whilst giving out instructions or warnings to others.

The example described so far has related to a gaming system for use on a tablet computer. It will be appreciated that this is merely one example of an application of the interactive video system. In another example, the system is configured as a training system for an industrial process. The use of the system provides an interactive and intuitive way by which, with the use of technical means in the form of the motion and/or sound sensors, improved training can be given to personnel in such a way that accidents will be able to be avoided or reduced in industrial circumstances.

For example, the introductory menu, instead of showing the selection of four different animals with which a user can interact, shows a number of images relating to typical industrial locations. One example could be the situation on an oil rig, one the position within a factory production line, one within a large scale milk dairy and one within a semiconductor manufacture clean room. Each of these situations are ones in which an error of behaviour in the event of an accident can be exceedingly dangerous, not to mention costly to the site owner. The present interactive video system provides an intuitive and natural way for a user to be trained in how to react and deal with circumstances in which an accident could occur.

In one example, the introductory menu, shows the four situations mentioned above as possibilities. A user would select one, say the semiconductor manufacture clean room, and then a scenario would be shown in which a semiconductor is being produced in clean room conditions. The video would include a question such as "A worker has entered the clean room environment wearing outdoor shoes without any protective layers. What action should you take? If you think you should take action A, tilt the tablet to the left, if you think you should take action B, tilt the tablet to the right"

Thus a real world scenario has been presented to the user and a direct physical response is required.

This experience will help the user when he finds himself in a similar situation in the real world and provides a way in which training can be given without the risk or cost of an actual occurrence taking place in the clean room environment.

It will be understood that software code may be provided either alone or embodied on a machine readable medium which when loaded up on a tablet computing device, smartphone or other such computing device causes the device to function as an interactive video system as generally described herein, including any possible combination of features described herein.

Embodiments of the present invention have been described with particular reference to the examples illustrated. However, it will be appreciated that variations and modifications may be made to the examples described within the scope of the present invention.

The invention claimed is:

1. An interactive video system, comprising:
a display arranged to display a video;
a motion sensor integrated with the display,
a controller, responsive to detection of a signal from the motion sensor derived when the display is moved, to cause a different video file to be played; and
a sound sensor, wherein the sound sensor is coupled to the controller, the controller also being arranged to be responsive to detection of a signal from the sound sensor to cause a different video file to be played, wherein the display is arranged to display a sliding scale to indicate volume of sound detected by the sound sensor and to indicate a threshold volume required for said different video file to played.

2. The interactive video system according to claim 1, wherein the controller is configured to cause a change in the video only when receiving simultaneously a signal from the motion sensor and the sound sensor.

3. The interactive video system according to claim 1, wherein the display is arranged to display a sliding scale to indicate level of movement detected by the motion sensor, wherein the display is arranged to display a sliding scale to indicate level of movement detected by the motion sensor and to indicate a threshold level of movement required for said different video file to be played.

4. The interactive video system according to claim 1, wherein the display is provided on a hand held video display device.

5. The interactive video system according to claim 4, wherein the hand held video display device is a tablet computer or smartphone.

6. A method of controlling an interactive video system, the method comprising:
displaying a video of a subject;
providing a motion sensor integrated within the video display;
providing a controller, the controller being arranged to be responsive to detection of a signal from the motion sensor derived when the display is moved to cause a different video file to be played; and
providing a sound sensor, wherein the sound sensor is coupled to the controller, the controller also being arranged to be responsive to detection of a signal from the sound sensor to cause a different video file to be played, wherein the display is arranged to display a sliding scale to indicate volume of sound detected by the sound sensor and to indicate a threshold volume required for said different video file to be played.

7. The method according to claim 6, wherein the controller is configured to cause a change in the video only when receiving simultaneously a signal from the motion sensor and the sound sensor.

8. A training system comprising an interactive video system comprising: a display arranged to display a video; a motion sensor integrated with the display, a controller, responsive to detection of a signal from the motion sensor derived when the display is moved, to cause a different video file to be played, and a sound sensor, wherein the sound sensor is coupled to the controller, the controller also being arranged to be responsive to detection of a signal from the sound sensor to cause a different video file to be played, wherein the display is arranged to display a sliding scale to indicate volume of sound detected by the sound sensor and to indicate a threshold volume required for said different video file to be played, the training system being arranged to display video of a training scenario and to prompt a user for an input and to provide feedback to the user dependent on the user input.

9. The training system according to claim 8, in which the training scenario relates to an industrial manufacturing or processing plant.

10. The training system according to claim 8, in which the training scenario includes video of an accident in an industrial environment and prompts for a user response to the scenario.

11. The training system according to claim 8, wherein the display is provided on a hand held video display device.

12. The training system according to claim 11, wherein the hand held video display device is a tablet computer or smartphone.

13. A gaming system including an interactive video system comprising: a display arranged to display a video; a motion sensor integrated with the display, a controller, responsive to detection of a signal from the motion sensor derived when the display is moved, to cause a different video file to be played, and a sound sensor, wherein the sound sensor is coupled to the controller, the controller also being arranged to be responsive to detection of a signal from the sound sensor to cause a different video file to be played, wherein the display is arranged to display a sliding scale to indicate volume of sound detected by the sound sensor and to indicate a threshold volume required for said different video file to be played, and wherein the video is video of an animal in an environment, and the video includes prompts to user to drive a change in the animal's environment.

14. The gaming system according to claim 13, wherein the change includes one or more of providing the animal, with food, providing the animal with water, providing the animal with instruction to move in a certain direction.

15. The interactive video system according to claim 1, wherein the display is provided on a hand held video display device.

16. The interactive video system according to claim 15, wherein the hand held video display device is a tablet computer or smartphone.

* * * * *